(12) United States Patent
Jandura

(10) Patent No.: US 6,837,699 B2
(45) Date of Patent: Jan. 4, 2005

(54) METHOD AND APPARATUS FOR CLAMPING USED IN MOLDING APPLICATIONS

(76) Inventor: John Jandura, 610 Industrial Blvd., Cleveland, GA (US) 30528

( * ) Notice: Subject to any disclaimer, the term of this patent is extended or adjusted under 35 U.S.C. 154(b) by 152 days.

(21) Appl. No.: 10/098,989

(22) Filed: Mar. 14, 2002

(65) Prior Publication Data

US 2003/0175378 A1 Sep. 18, 2003

(51) Int. Cl.[7] .............................................. B29C 33/22
(52) U.S. Cl. ...................... 425/451.5; 425/541; 425/592
(58) Field of Search ............................... 425/451.5, 541, 425/592

(56) References Cited

U.S. PATENT DOCUMENTS

| | | | |
|---|---|---|---|
| 722,822 A | * 3/1903 | Doughty | 425/541 |
| 2,792,591 A | * 5/1957 | Cardot et al. | 425/541 |
| 2,975,473 A | * 3/1961 | Hagen et al. | 425/541 |
| 3,277,534 A | * 10/1966 | McDonald et al. | 425/541 |
| 3,807,929 A | * 4/1974 | Moore | 425/541 |
| 3,849,049 A | * 11/1974 | Brieschke et al. | 425/541 |
| 3,924,987 A | * 12/1975 | Mehnert | 425/451.5 |
| 4,120,636 A | * 10/1978 | Appel et al. | 425/541 |
| 4,290,745 A | * 9/1981 | Kontz | 425/541 |
| 4,468,368 A | * 8/1984 | Hafele | 425/541 |
| 4,981,638 A | 1/1991 | Schad | |
| 4,984,980 A | 1/1991 | Ueno | |
| 5,192,557 A | 3/1993 | Hirata | |
| 5,206,035 A | 4/1993 | Shiotani | |
| 5,320,517 A | 6/1994 | Hirata | |
| 5,711,974 A | * 1/1998 | Poncet | 425/541 |
| 5,843,496 A | 12/1998 | Ito | |
| 6,102,685 A | * 8/2000 | Miura et al. | 425/451.5 |
| 6,224,367 B1 | * 5/2001 | Maier | 425/541 |

* cited by examiner

Primary Examiner—James P. Mackey
(74) Attorney, Agent, or Firm—Joseph G. Mitchell, Esq.

(57) ABSTRACT

The invention of this patent is to be used in molding applications. An external applied force causes an actuator rod to move in a linear motion. This motion causes two platens to move simultaneously together to form a clean, even mold. The platens move linearly on tie bars, which guide the linear movement of the platens. Linkage arms are mounted on a mounting plate and the linkage arms are connected to the platens. This allows the clamping and applied force stresses on the platens to be dependent on the mounting plate, rather than the tie bars. The platens travel at the same speed and distance in relation to each other. The result is an evenly produced part that comprises two die or mold halves which are perfectly centered.

2 Claims, 2 Drawing Sheets

METHOD AND APPARATUS FOR CLAMPING USED IN MOLDING APPLICATIONS

BACKGROUND OF THE INVENTION

1) Field of the Invention

The field of invention relates to a method and apparatus for clamping used in molding applications. More particularly, the invention provides for a method and apparatus wherein a platen arrangement meets together perfectly, with minimal deflection, to produce an evenly formed part from the combination of two die or mold halves.

2) Description of Prior Art

The present invention is a method and apparatus for clamping used in molding applications. It may be used for injection molding, thermoforming, stretch blow molding, die stamping and the like.

In the prior art, a clamping apparatus for clamping a mold comprises molding halves disposed on a fixed board and a moving board. Such boards are mounted on tie bars and the moveable parts of the clamping apparatus are also mounted on such tie bars. An example of this is contained in U.S. Pat. Nos. 5,192,557 and 5,320,517.

Also, in the prior art, the mechanism which causes the rotational linear motion of the moveable platen for the mold is mounted on a plurality of tie bars. An example of this is contained in U.S. Pat. No. 4,984,980.

However, the lack of a mounting plate mounting the moving parts of the clamping device causes deflection and an uneven resulting molded part.

In the present invention the primary moving parts are mounted on a mounting plate. This allows for the clamping of the platens and applied force stresses created thereby to be dependent on the mounting plate rather than the tie bars. In other clamping devices or prior art devices, the applied force stresses are applied to the tie bars which cause deflection and an uneven molded part.

SUMMARY OF THE INVENTION

In view of the foregoing disadvantages inherent in the known prior art, the present invention provides a method and apparatus used in molding applications. As such, the general purpose of the present invention, which will be described subsequently in greater detail, is to provide a new and improved device which has all the advantages of the prior art and none of the disadvantages.

The process begins with an external applied force, traveling in a linear motion, which causes an actuator rod to move in a linear motion. This movement, in turn, causes a rotary linkage to rotate about its pivot point. In turn, a series of linkage connectors, connected to linkage arms, cause such linkage arms to rotate around such linkage arms' pivot point. This rotary action causes platens to move simultaneously together to form a clean, even mold. While the platens move linearly on tie bars, which guide such linear movement, the linkage arms and rotary linkage are mounted on a mounting plate. This allows the clamping and applied force stresses on the platens to be dependent on the mounting plate, rather than the tie bars.

The clamping apparatus of the present invention is designed so that the platens travel at the same speed and distance in relation to each other. The result is an evenly produced part that comprises two die or mold halves which are perfectly centered.

This invention may be employed for injection molding, thermoforming, stretch blow molding, die stamping and similar devices.

The invention resides not in any one of these features per se, but rather in the particular combination of all of them herein disclosed and claimed, and it is distinguished from the prior art in this particular combination of all its structures for the functions specified.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method and device which has all of the advantages of the prior art and none of the disadvantages.

It is another object of the present invention to provide a new and improved method and device which may easily produce an even and perfectly formed molded part.

It is a further object of the present invention to promote a new and improved method and device which can produce different size parts.

It is a further object of the present invention to promote a new and improved method and device which provides a better and more reliable product due to the mounting of primary moving parts onto a mounting plate, rather than tie bars so as to counteract vibrations caused when the invention is in operation.

It is a further object of the present invention to promote a new and improved method and device which provides an easy method to set-up and use.

An even further object of the present invention is to provide a new and improved method and device which is susceptible of a low cost of manufacture with regard to both materials and labor, thereby making such method and device economically advantages to use.

Still yet another object of the present invention is to provide a new and improved device which provides in the apparatuses and methods of the prior art some of the advantages thereof, while simultaneously overcoming some of the disadvantages normally associated therewith.

It is a further object of the present invention to provide a new and improved method and device that can be used employed in a number of different applications. A few of which are: injection molding, blow molding, thermoforming and die stamping.

These together with other objects of the invention, along with the various features of novelty which characterize the invention, are pointed out with particularity in the claims annexed to and forming a part of this disclosure. For a better understanding of the invention, its operating advantages and the specific objects attained by its use, reference should be had to accompanying drawings and descriptive matter which there is illustrated preferred embodiments of the invention.

BRIEF DESCRIPTION OF THE INVENTION

The invention will be better understood based on the following detailed description. Such description makes reference to the annexed drawings wherein.

DESCRIPTION OF THE PREFERRED EMBODIMENT

Figure 1:
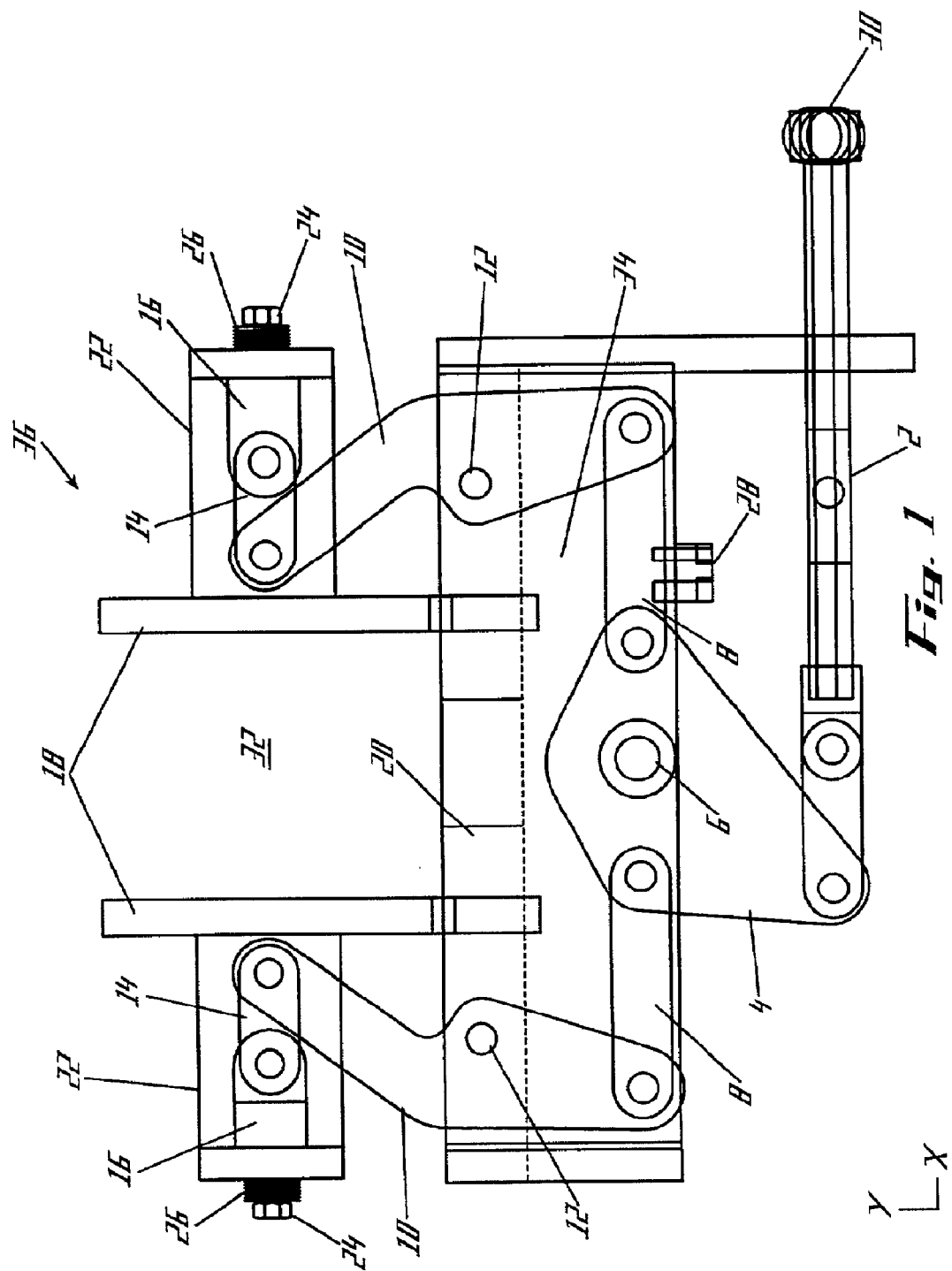
FIG. 1 shows a top view of the invention.
Figure 2:
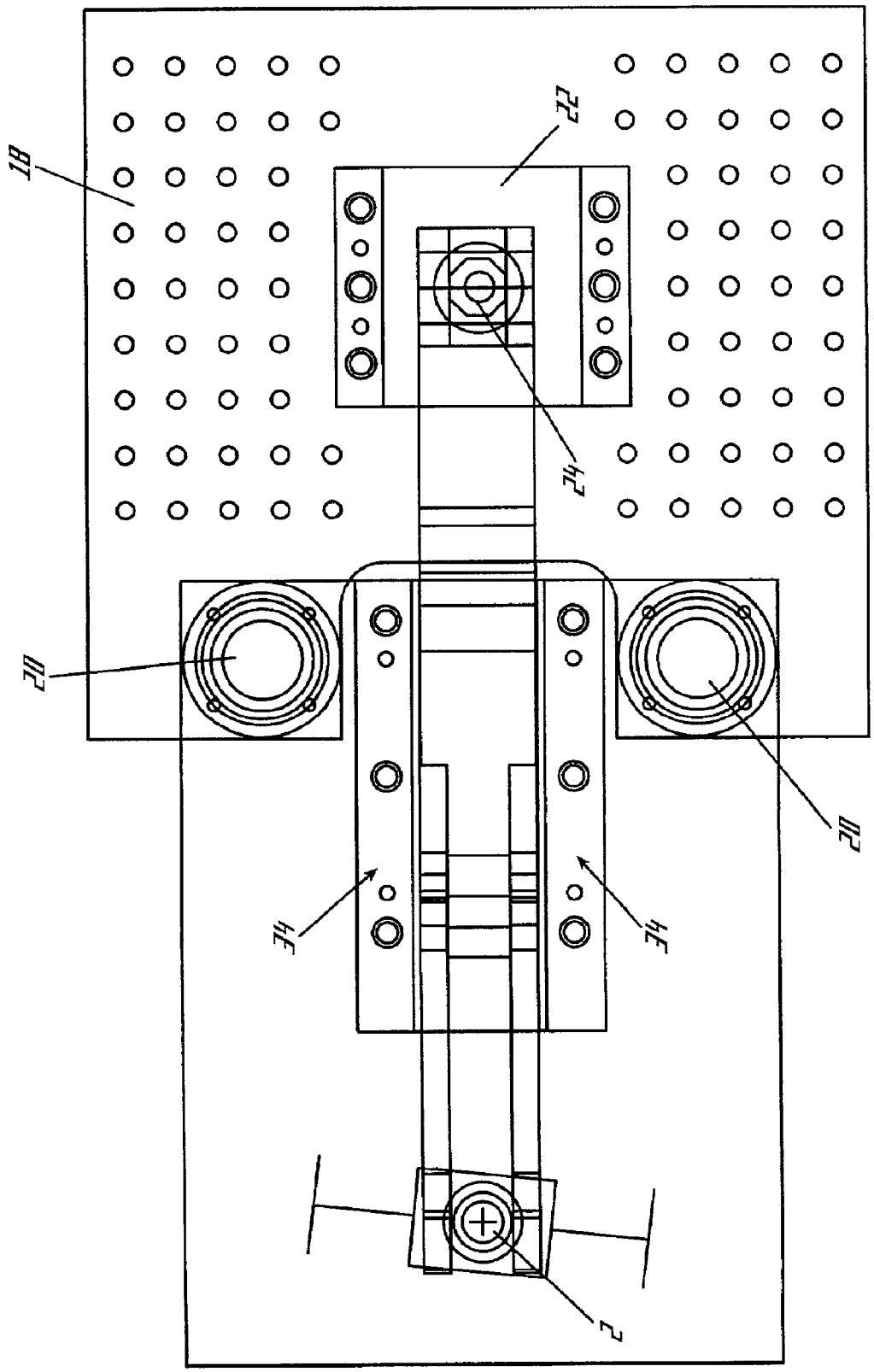
FIG. 2 shows a side view of the invention.

With reference now to the drawings, and in particular FIGS. 1 and 2, a method and apparatus for the clamping used in molding applications which embodies the principles and concepts of the present invention.

With reference to FIG. 1, FIG. 1 depicts a top view of the present invention. The invention is a method and apparatus for clamping used in molding applications 36 where an external force 30 is applied in a linear motion to an actuator rod 2. The external force 30 can be caused by electrical, mechanical or hydraulic means. The preferred method is to use electrical means to apply the thrust load of approximately 1200 to 1400 ft./lbs which develops 10 tons of pressure in the molding area 32. The preferred method is to have the ability to adjust the external force 30 based on the particular molding application.

Once the external force 30 is applied to the actuator rod 2, the actuator rod 2 moves toward the direction of the molding area 32, and the actuator rod 2 causes the rotary linkage 4 to rotate around the rotary linkage pivot point 6. This rotary motion causes the linkage connectors 8, which are connected to the rotary linkage 4 to move. This movement causes the linkage arms 10 to rotate about the linkage arm pivot point 12. The rotary linkage 4 enables both linkage arms 10 to travel at the same speed and distance in relation to each other. The platens 18 slide along the tie bars 20.

A bridge assembly comprises a housing 22, a connector 14, a mounting connector 16, a platen 18, a Bellville disc 26 and a bolt 24. There are duel bridge assembly housings 22. The bolt 24 is connected to the mounting connector arm 16 and the Bellville disc 26 is placed between said bolt 24 and mounting connector arm 16. A connector 14 is connected to said mounting connector arm 16 and the linkage arm 10. At the opposite end of the bolt 24 in said bridge assembly housing 22 is mounted a platen 18. The platen 18 is arranged so as to produce a part with two die or mold halves when meeting in the molding area 32.

The platens 18 and linkage arms 10 slide along tie bars 20 which help guide the bridge assembly housing 22, with attached platens 18, keeping them moving along a linear motion. The Bellville disc 26 allow for over stroke compensation. Springs can also be used in place of the Bellville discs 26.

The rotary linkage 4 and linkage arms 10 are mounted on a mounting plate 34. This allows the resultant clamping and applied force stresses to be depended on the mounting plate 34, not the tie bars 20. By this design the force is not applied to the tie bars 20; thus, there is greater reduction in deflection or an uneven mold since the force, in the present invention, is absorbed by the mounting plate 34, not the tie bars 20.

The clamping of the platens 18 occur in the molding area 32 produce an even mold as the rotary linkage 4 moves the linkage connectors 8 about the rotary linkage pivot point 6. So that the linkage connectors 8 do not continue to move due to this rotary force, the linkage connectors 8 are stopped by means of a stop block 28. At this point, the platens 18 are clamped in the molding area 32 and the clamp force is maintained. No external force 30 is required. To unlock the connection of the platens 18 and free the molding area 32, the external force 30 is applied to move the actuator arm 2 in the opposite direction of its initial movement. The result is an even, perfectly formed or molded part. The process can then be repeated.

Tests show that the preferred method is to apply an external force 30 such that it is one twentieth to one tenth the actual clamping force.

With reference to FIG. 2, FIG. 2 depicts the side view of the present invention. A platen 18 is connected to a bridge assembly housing 22. The platen 18 is mounted on the tie bars 20. The rod 2 causes the rotary linkage 4 and linkage arms 10 to move which causes the platen 18 to move. The rotary linkage 4 and linkage arms 10 are mounted on a mounting plate 34.

The invention may be used for injection molding, thermoforming, stretch blow molding, die stamping and the like wherein a platen arrangement is used to product a part with two die or mold halves meeting together.

With respect to the above description then, it is to be realized that the optimum dimensional relationships for the invention to include variations in size, materials, shape, form, function and manner of operation, assembly and use, are deemed readily apparent and obvious to one skilled in the art, and all equivalent relationships to those skilled in the art, and all equivalent relationships to those illustrated in the drawings and described in the specification are intended to be encompassed by the present invention.

Thus, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An apparatus for clamping used in molding applications, comprising:

an actuator arm;

a rotary linkage connected to said actuator arm;

a first linkage connector connected to said rotary linkage;

a second linkage connector connected to said rotary linkage;

a first linkage arm;

a second linkage arm;

said first linkage arm is connected to said first linkage connector;

said second linkage arm is connected to said second linkage connector;

a first connector;

a second connector;

said first linkage arm is connected to said first connector;

said second linkage arm is connected to said second connector;

a first mounting connector which is connected to said first connector;

a second mounting connector which is connected to said second connector;

a first housing having said first mounting connector contained therein;

a second housing having said second mounting connector contained therein;

said first connector is connected to said first mounting connector contained within said first housing;

said second connector is connected to said second mounting connector within said second housing;

a first platen which is connected to said first housing;

a second platen which is connected to said second housing;

a first Bellville disc providing a biasing force relative to said first housing and said first mounting connector;

a second Bellville disc providing a biasing force relative said second housing and said second mounting connector;

tie bars;

said first platen and said second platen slide along said tie bars;

a mounting plate;

a stop block mounted to said mounting plate and said stop block cooperates with said first linkage connector to limit the movement of said first linkage connector; and said rotary linkage, said first linkage arm and said second linkage arm are mounted on said mounting plate.

2. The apparatus as defined in claim 1, further comprising:

a first bolt connected to said first mounting connector within said first housing with said first Bellville disc between said first bolt and said first housing; and a second bolt connected to said second mounting connector within said second housing with said second Bellville disc between said second bolt and said second housing.

* * * * *